US007990017B2

(12) United States Patent
Hirabayashi

(10) Patent No.: US 7,990,017 B2
(45) Date of Patent: Aug. 2, 2011

(54) DC MOTOR HAVING ENHANCED STARTABILITY

(75) Inventor: Takashi Hirabayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 412 days.

(21) Appl. No.: 11/984,879

(22) Filed: Nov. 23, 2007

(65) Prior Publication Data

US 2008/0174117 A1 Jul. 24, 2008

(30) Foreign Application Priority Data

Nov. 24, 2006 (JP) ................................. 2006-317095

(51) Int. Cl.
*H02K 13/10* (2006.01)

(52) U.S. Cl. ......................... 310/233; 310/239; 310/245

(58) Field of Classification Search .................. 310/233, 310/235, 236, 237, 246, 248, 251-253
See application file for complete search history.

(56) References Cited

U.S. PATENT DOCUMENTS 6,066,907 A * 5/2000 Matsushima et al. ......... 310/239
2004/0140729 A1* 7/2004 Niimi ............................ 310/233
2005/0285459 A1* 12/2005 Ishida et al. .................... 310/62
2006/0267446 A1* 11/2006 Hirabayashi et al. ......... 310/248

FOREIGN PATENT DOCUMENTS

DE 28 22 239 A1 12/1979
DE 10 2004 002 699 A1 7/2004
GB 1 580 294 12/1980
JP A-62-118732 5/1987
JP B2-5-10903 2/1993
JP 2001136710 A 5/2001
JP A 2001-136710 5/2001
JP A 2003-125558 4/2003
JP A 2003-244900 8/2003
JP A 2004-229352 8/2004
JP A-2006-333609 12/2006
JP A-2006-333681 12/2006
JP A-2006-340431 12/2006
JP A-2006-348870 12/2006

OTHER PUBLICATIONS

Tanaka et al, machine translation of JP 2001136710 A, all.
Notification of Reasons for Rejection issued in Japanese Patent Application No. 2006-317095; mailed June 22, 2010; with English-language translation.
Office Action issued in German Patent Application No. 102007055624.3-32; Aug. 2, 2010; with English-language translation.

* cited by examiner

*Primary Examiner* — Quyen Leung
*Assistant Examiner* — Naishadh N Desai
(74) *Attorney, Agent, or Firm* — Oliff & Berridge, PLC

(57) ABSTRACT

A dc motor is provided which is equipped with brushes each of which is urged by a spring pressure into constant abutment with a commutator surface. A plurality of protrusions are arrayed on the commutator surface in a direction perpendicular to a direction in which a commutator is to be rotated and extend over a whole of a circumference of the commutator surface. Each of the protrusions is defined by two side walls arrayed adjacent each other. At least one of the two side walls of each of the protrusions is oriented to be inclined at a preselected angle to the orientation of the spring pressure. The preselected angle lies within a range of 20° to 70°. This ensures the stability of the abutment of the brush with the commutator surface, thus enhancing the startability of the dc motor.

10 Claims, 8 Drawing Sheets

(VIEWED FROM Z IN FIG.7)

DC MOTOR HAVING ENHANCED STARTABILITY

CROSS REFERENCE TO RELATED DOCUMENT

The present application claims the benefits of Japanese Patent Application No. 2006-317095 filed on Nov. 24, 2006, the disclosure of which is incorporated herein by reference.

BACKGROUND OF THE INVENTION

1. Technical Field of the Invention

The present invention relates generally to a dc motor equipped with permanent magnets used as field magnets, and more particularly to an improved structure of such a motor designed to have enhanced startability thereof.

2. Background Art

Japanese Patent Second Publication No. 5-10903 teaches techniques for improving the speed of a dc motor equipped with permanent magnets in a low-current range without sacrificing the torque output in a high-current range in order to enhance the startability thereof at room temperature. Specifically, the structure, as taught in such a publication, has magnetic material-made auxiliary poles each of which is disposed on a magnetizing side of one of permanent magnets working as main poles where the armature reaction is developed, thereby increasing effective magnetic fluxes which are produced from the auxiliary poles and link with armature coils to increase the output of the motor.

The above structure, however, has the drawback in that the auxiliary poles are magnetized during energization of the armature coils to produce magnetic attraction between the auxiliary poles and an armature, thus requiring the need for securing the auxiliary poles to a yoke against the magnetic attraction. For example, it is necessary to weld the auxiliary poles to the yoke or to place a sleeve on an inner circumferential side of each of the auxiliary poles.

Additionally, as compared with motors equipped with the auxiliary poles, the above dc motor also has the problems of increases in number of component ports and production cost thereof.

SUMMARY OF THE INVENTION

It is therefore a principal object of the invention to avoid the disadvantages of the prior art.

It is another object of the invention to provide a dc motor which may be employed as a starter motor for internal combustion engines and is designed to have startability thereof enhanced without use of auxiliary poles.

According to one aspect of the invention, there is provided a dc motor which comprises: (a) a yoke forming a magnetic circuit; (b) an array of permanent magnets disposed along an inner circumference of the yoke; (c) an armature disposed inside the array of permanent magnets to be rotatable; (d) a commutator provided to be rotatable together with the armature, the commutator having an outer circumferential surface; (e) a brush riding on a commutator surface that is the outer circumferential surface of the commutator, the brush being urged elastically in a given direction into constant engagement with the commutator surface; and (f) a plurality of protrusions that are arrayed on the commutator surface in a first direction perpendicular to a second direction that is a direction in which the commutator is to be rotated and extend over a whole of a circumference of the commutator surface. Each of the protrusions is defined by two side walls arrayed adjacent each other in the first direction. At least one of the two side walls of each of the protrusions is oriented to be inclined at a preselected angle to the given direction in which the brush is urged elastically. The preselected angle is selected to fall in a range of 20° to 70°.

The protrusions on the commutator surface serve to ensure the stability of engagement of the brush 6 with the commutator surface, thereby enhancing the effects of improvement on the commutation (will also be referred to as voltage commutation below) which cancel the reactance voltage, as produced during the commutation, by the electromotive force, as produced by the coils 9 immediately before the commutation. This causes the distribution of current flowing between the brush and the commutator surface in a low-current range to be biased toward an upstream portion (i.e., a leading portion) of the brush in a direction of rotation of the armature, thereby producing substantially the same effects as those in the case where the angle of brush shift is changed in a conventional structure.

In a high-current range, the current density in the brush increases, thereby reducing the effects of the voltage commutation so that the output performance of the dc motor will be identical with those in typical dc motors. Specifically, the structure of the dc motor of the invention serves to improve the speed of rotation thereof without use of the auxiliary poles in the conventional structure, as discussed in the introductory part of this application, thus enhancing the startability of the dc motor at room temperatures at decreased costs.

The inclination of the side walls of the protrusions to the direction in which the brush is urged elastically enhances the efficiency in exerting the elastic pressure on the side walls, thus resulting in the stability of sliding motion of the brush in contact with the commutator surface to enhance the improvement of the speed of rotation of the armature in the low-current range.

In the preferred mode of the invention, the two side walls of each of the protrusions are oriented to be inclined at the preselected angle to the given direction.

The range of the preselected angle at which the least one of the two side walls of each of the protrusions is inclined is preferably 30° to 55°.

The range of the preselected angle at which the least one of the two side walls of each of the protrusions is inclined is more preferably about 45°.

The brush has a sliding surface placed in sidable contact with the commutator surface. The sliding surface has a width B extending in the first direction. Each of the protrusions has a top surface defined between the side walls. A total width L that is the sum of widths of the top surfaces of the protrusions lying within the width B is selected to meet a relation of $L/B \leqq 1/2$. When the brush is initially placed in the constant engagement with the commutator surface, the sliding surface of the brush is substantially shaped to conform to a contour of the commutator surface in a circumferential direction thereof. Specifically, the width B of the brush and the total width L of the top surfaces meeting the relation of $L/B \leqq 1/2$ result in initial exertion of the elastic pressure on the sliding surface the brush which is two or more times greater than that when the sliding surface of the brush is worn, so that it conforms to the protrusion, thus ensuring the stability of engagement of the brush with the commutator surface.

Each of the protrusions has corners each of which is defined between the top surface and one of the side walls. Each of the corners is shaped sharply.

Each of the corners is rounded at a radius of curvature of 0.1 mm or less.

The armature has an armature shaft producing torque. The commutator includes a plurality of commutator segments arrayed in a cylindrical form around an outer periphery of the armature shaft to define the commutator surface.

The armature has an armature shaft producing torque. The commutator includes a plurality of commutator segments arrayed to define the commutator surface extending in a direction perpendicular to the armature shaft.

The dc motor may be used as a starter motor designed to start an internal combustion engine.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
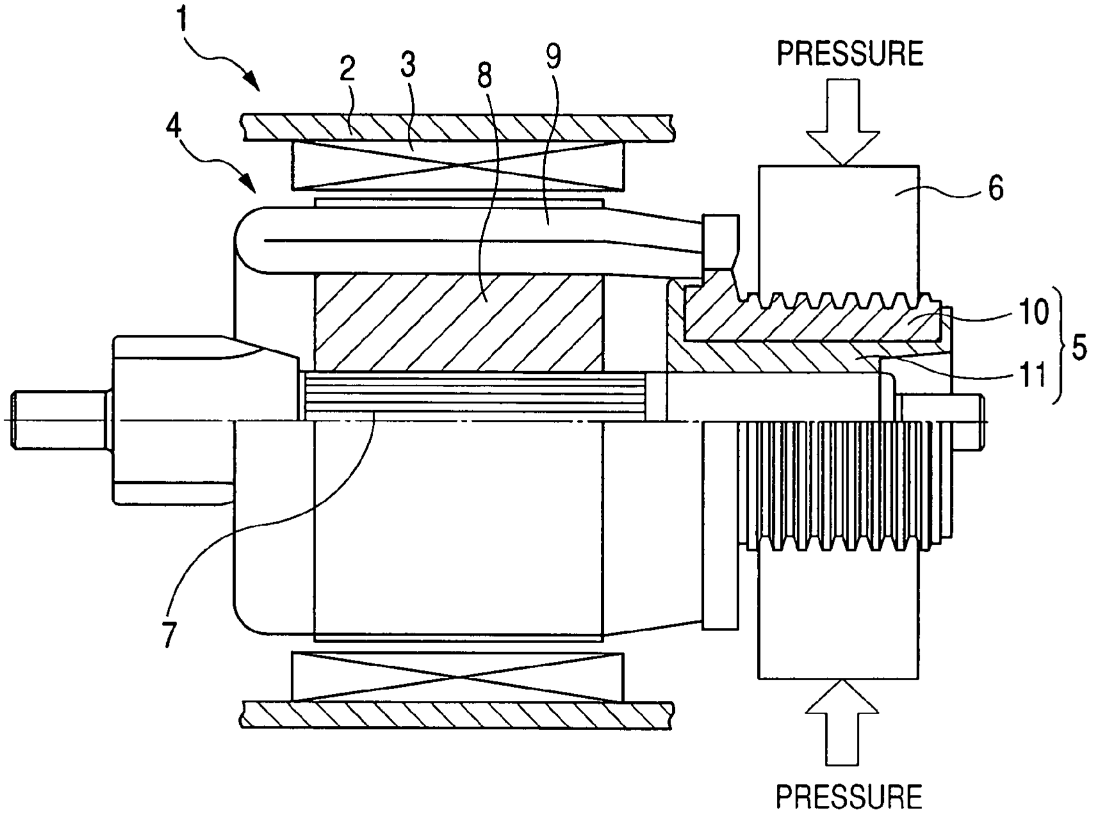
FIG. 1 is a partially sectional view which shows a dc motor according to the first embodiment of the invention.

Referring to the drawings, wherein like reference numbers refer to like parts in several views, particularly to FIG. 1, there is shown a dc motor according to the invention which is used as, for example, a starter motor 1 installed in an engine starter for internal combustion engines.

The starter motor 1 consists essentially of a yoke 2 forming a magnetic circuit, a plurality of permanent magnets 3 retained along an inner circumference of the yoke 2, an armature 4 disposed inside an array of the magnets 3 with an air gap between itself and an inner circumference of the array of the magnets 3 to be rotatable, a commutator 5, and brushes 6.

The armature 4 is made up of an armature shaft 7 producing torque, an armature core 8 which is press fit on an outer periphery of the armature shaft 7 through serrations, and armature coils 9 extending through slots (not shown) formed in the armature core 8.

The commutator 5 is made up of a plurality of commutator segments 10 and an insulator 11 which is molded by resin with the commutator segments 10 to retain them. The insulator 11 is press-fit on the outer periphery of an end portion of the armature shaft 7. The commutator segments 10 are arrayed at regular or equi-intervals in a circumferential direction of the insulator 11 and insulated electrically from each other through the insulator 11. Each of the commutator segments 10 is joined mechanically and electrically to an end of one of the armature coils 9 extending from the slot of the armature core 8.

The brushes 6 are each made of, for example, a sintered mixture of carbon and copper powder and ride on an outer surface (which will also be referred to as a commutator surface below) of the commutator 5. Each of the brushes 6 is urged by an elastic member such as a spring (not shown) into constant abutment with the surface of the commutator 5. A combination of each of the brushes 6 and a corresponding one of the springs may be of a known structure, and explanation thereof in detail will be omitted here.

The feature of the structure of the stator motor 1 will be described below.

Figure 2:
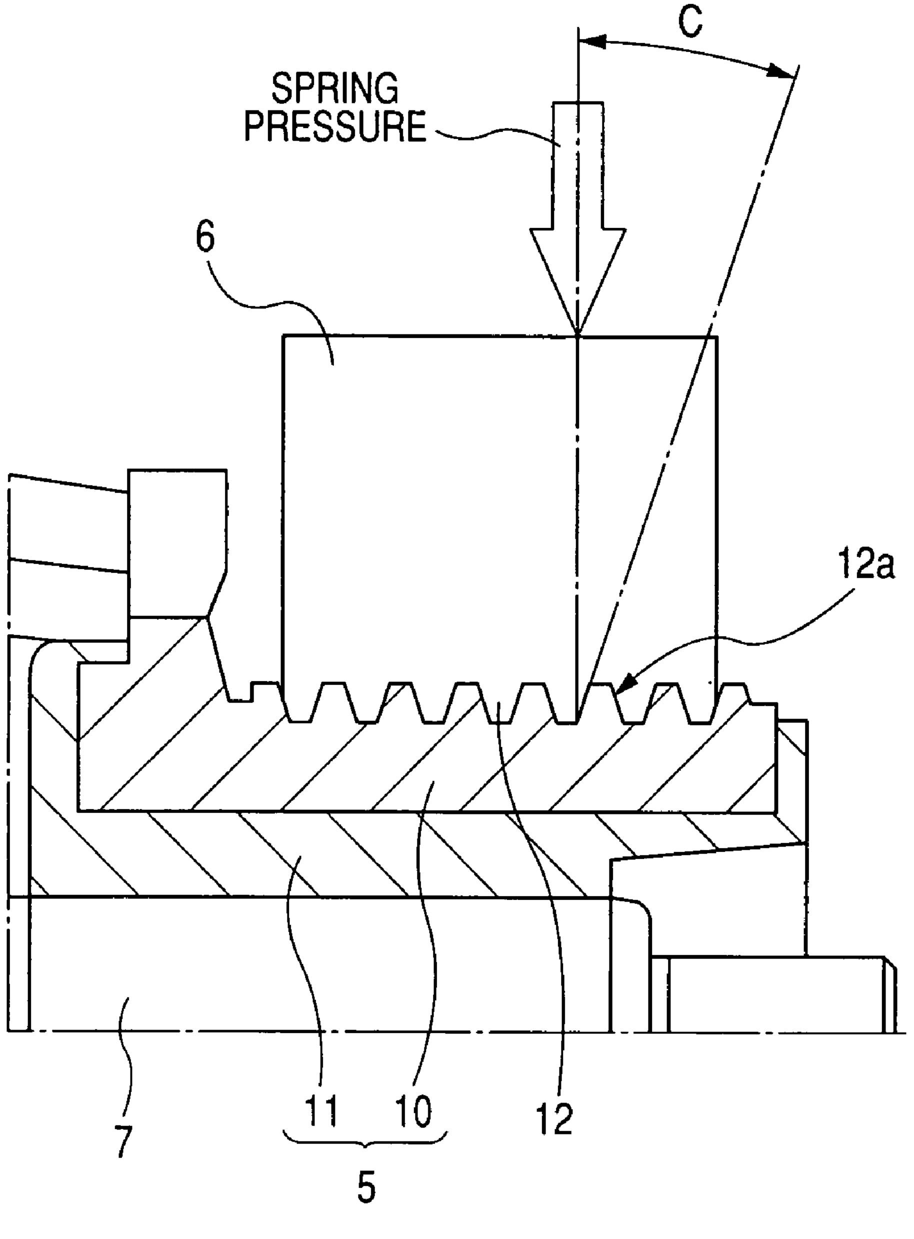
FIG. 2 is a partially enlarged view which shows a brush and a commutator installed in the dc motor of FIG. 1.

The commutator surface has, as clearly illustrated in FIG. 2, a plurality of substantially V-shaped grooves 12 extending in a circumferential direction thereof (i.e., a direction of rotation of the commutator 5). Specifically, the grooves 12 are arrayed in parallel at an equi-interval away from each other (i.e., a lateral direction in the drawing) and each extend over the whole of the circumference of a circular or cylindrical array of the commutator segments 10. In other words, protrusions or ridges are arrayed on the outer surface of each of the commutator segments 10 at a regular interval in an axial direction of the commutator 5.

Each of side walls **12*a* of the grooves 12 (i.e., the ridges) slants with respect to the axial direction of the commutator 5. Specifically, each of the side walls 12*a* extends at an angle C to the direction in which the pressure, as produced by each of the springs, acts on one of the brushes 6**. The angle C is determined preferably to fall within a range of 20° to 70°, more preferably within a range of 30° to 55°, and still more preferably to be about 45°.

The ridges (i.e., the grooves 12) of the commutator 5 serve to ensure the stability of engagement of the brushes 6 with the surface of the commutator 5, thereby enhancing the effects of voltage commutation which cancel the reactance voltage, as produced during the commutation, by the electromotive force, as produced by the coils 9 immediately before the commutation. This causes the distribution of current flowing between the brush and the commutator surface in a low-current range to be biased toward an upstream portion (i.e., a leading portion) of the brush in a direction of rotation of the armature, thereby producing substantially the same effects as those in the case where the angle of brush shift is changed in a conventional structure.

In a high-current range, the current density in the brushes 6 increases, thereby reducing the above described effects of the voltage commutation so that the output performance of the starter motor 1 will be identical with those in typical starter motors. Specifically, the structure of the start motor 1 of this embodiment serves to improve the speed of rotation thereof without use of the auxiliary poles in the conventional structure, as discussed in the introductory part of this application, thus enhancing the startability of the starter motor 1 at room temperatures at decreased costs.

Figure 3:
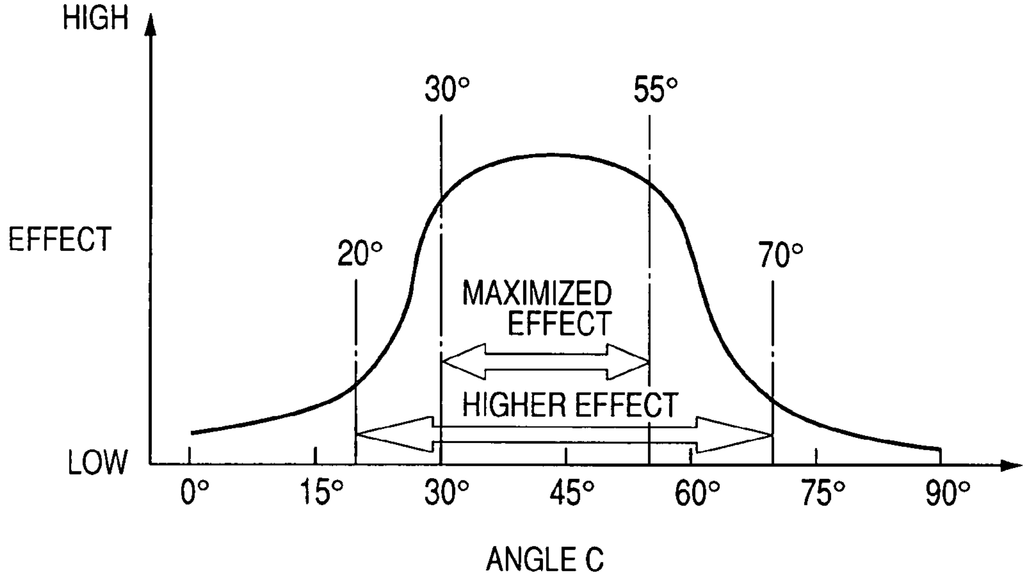
FIG. 3 is a graph of experimental results representing a relation between an angle of inclination of side walls of grooves in a commutator to a direction in which spring pressure acts on a brush and the speed of an armature.

The inclination of the side walls **12*a* of the grooves 12 to the direction or orientation of the spring pressure acting on the brushes 6 enhances the efficiency in exerting the spring pressure on the side walls 12*a*, thus resulting in the stability of sliding motion of the brushes 6 in contact with the commutator 5 to enhance, as demonstrated in FIG. 3, the improvement of the speed of rotation of the armature 4** in the low-current range.

FIG. 3 is a graph of experimental results representing a relation between the angle C of the inclination of the side walls 12*a* of the grooves 12 to the direction in which the spring pressure acts on the brushes 6 and the speed of the armature 4 without any load thereon in the low-current range. The graph shows that the improvement on the speed of the armature 4 is increased greatly when the angle C lies within a range of 20° to 70° and maximized when the angle C lies within a range of 30° to 55°.

Only either one of the side walls 12*a* of each of the grooves 12 may be inclined at the angle C of 20° to 70°, preferably of 30° to 55°. In this case, we has found that the improvement on the speed of the armature 4 is different in degree from the above, but it is maximized when the angle C lies within a range of 30° to 55°.

Figure 4:
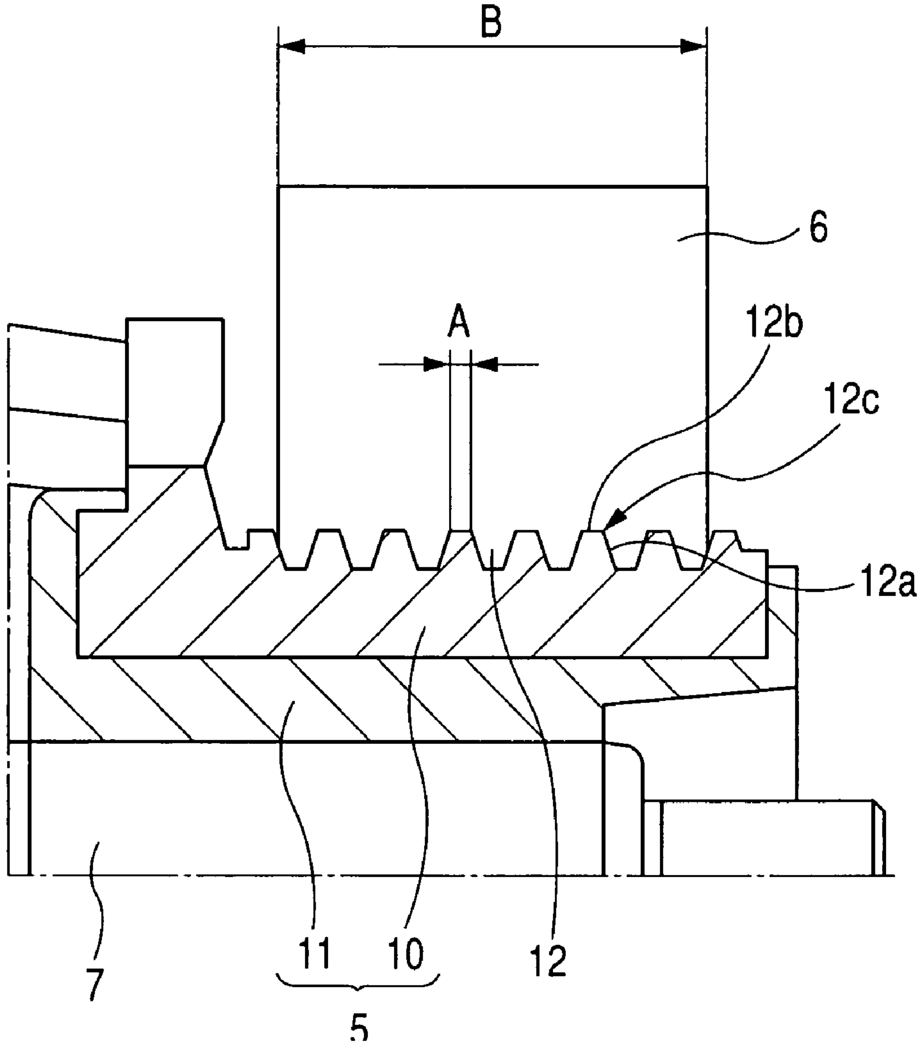
FIG. 4 is a partially enlarged view which shows a brush and a commutator installed in a dc motor according to the second embodiment of the invention.

FIG. 4 illustrates the brushes 6 and the commutator 5 installed in the starter motor 1 according to the second embodiment of the invention.

The width B of each of the brushes 6, that is, the distance between opposed sides of the bottom surface (will also be referred to as a sliding surface below) of the brush 6 placed in slidable contact with the surface of the commutator 5, as defined in the axial direction of the commutator 5 (i.e., the lateral direction in the drawing) and a total width L that is the sum of widths A of the top surfaces 12*b* of the ridges, as defined by the grooves 12 of the commutator 5, within the width B are selected to meet a relation of L/B≦=1/2. In the illustrated case, since six of the top surfaces 12*b* of the ridges lie within the width B, the total width L will be 6×A.

Figure 5:
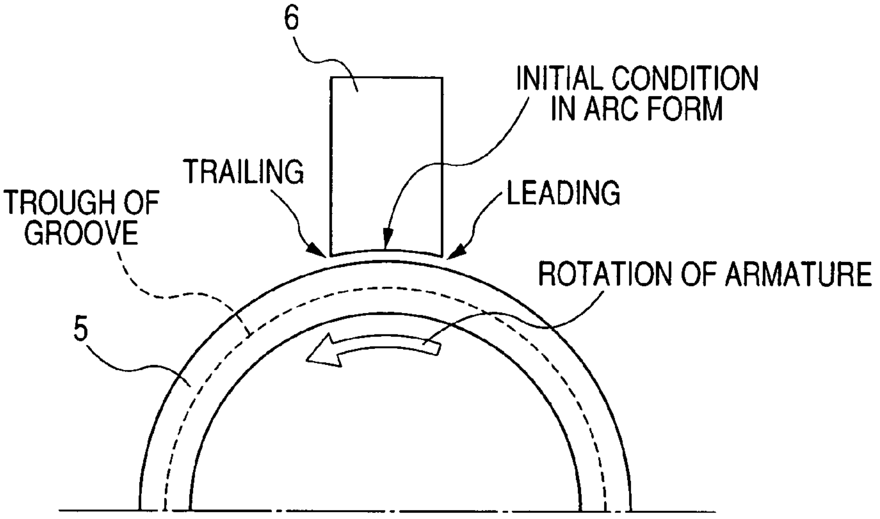
FIG. 5 is a partially side view which shows the shape of a brush before worn by sliding thereof on a commutator in the second embodiment.

The sliding surface of each of the brushes 6 is machined to have an even surface curved in concave form in the direction of rotation of the commutator 5, as illustrated in FIG. 5, before installed in the starter motor 1. The curvature of the sliding surface is substantially identical with that of the circumference of the commutator 5. In other words, the sliding surface have no irregularities before worn by the sliding thereof on the surface of the commutator 5.

Corners 12*c* of the ridges, as each defined by a boundary between one of the top surfaces 12*b* of the ridges and an adjacent one of the side walls 12*a*, is rounded sharply at a radius of curvature of 0.1 mm or less. Specifically, each of the corners 12*c* is formed to have a relatively great curvature (i.e., a relatively small radius of curvature).

The sliding surface of each of the brushes 6 is, as described above, shaped to conform to the contour of the commutator 5 in the circumferential direction thereof, thus ensuring the physical contact of the whole of the sliding surface with the commutator surface in the direction of the sliding motion of the brushes 6.

Figure 6:
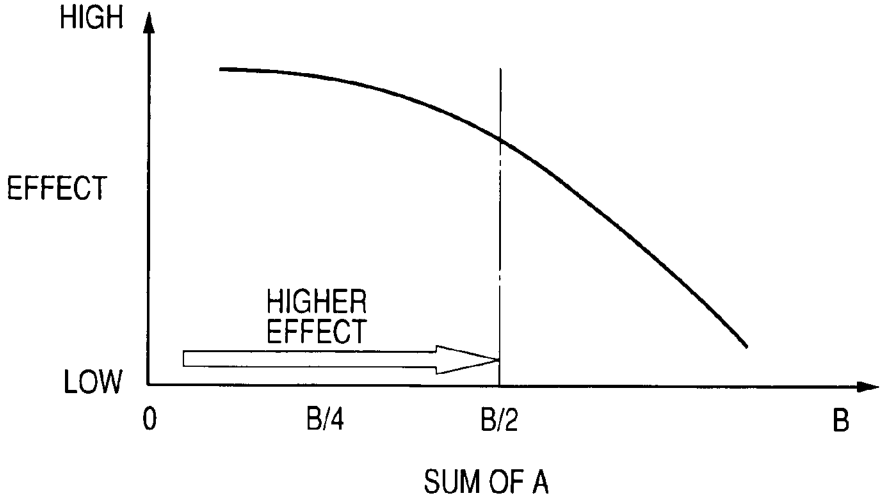
FIG. 6 is a graph of which demonstrates experimental results showing a relation between the improvement on the speed of an armature and the total width L of top surfaces of protrusions on a commutator when a dc motor is rotated without any load thereon in a low-current range in the second embodiment.

The width B of each of the brushes 6 and the total width L of the top surfaces 12*b* of the ridges on the commutator 5, as selected to meet the relation of L/B≦1/2, results in initial exertion of the spring pressure on the sliding surface of each of the brushes 6 which is two or more times greater than that when the sliding surface of the brush 6 is worn, so that it conforms to the grooves 12, thus ensuring the stability of engagement of the brushes 6 with the commutator 5. FIG. 6 is a graph which demonstrates experimental results showing a relation between the improvement on the speed of the armature 4 and the total width L of the top surfaces 12*b* when the starter motor 1 is rotated without any load thereon in the low-current range. The graph shows that the improvement on the speed of the armature 4 is increased greatly even before the sliding surface of each of the brushes 6 conforms closely to the grooves 12.

The sharply shaped corners 12*c* serve to facilitate the conforming of the sliding surface of each of the brushes 6 in the mint condition to the grooves 12 of the commutator 5, thus ensuring the stability of sliding contact therebetween within a decreased time.

Other arrangements are identical with those in the first embodiment, and explanation thereof in detail will be omitted here.

Figure 7:
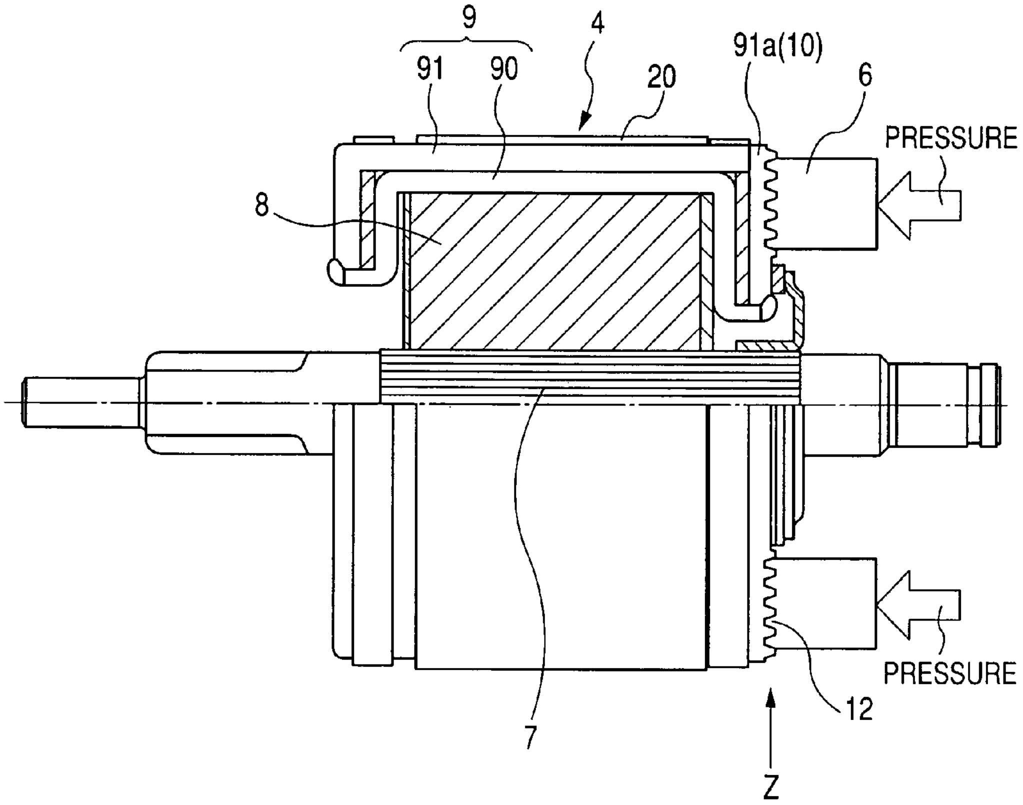
FIG. 7 is a partially sectional view which shows a dc motor according to the third embodiment of the invention.

FIG. 7 is a partially sectional view which shows the brushes 6 and the armature 4 according to the third embodiment of the invention which may be installed in the starter 1, as illustrated in FIG. 1.

The armature 4 has the commutator 5 extending perpendicular to the axis of the armature shaft 7. Specifically, a portion of each of the armature coils 9 extending outside one of slots 20 of the armature core 8 is disposed in parallel to an end surface of the armature core 8 to form one of the commutator segments 10.

The armature coils 9 is made up of as many combinations of lower coil layers 90 and upper coil layers 91 as the slots 20 formed in the armature core 8. Each of the lower coil layers 90 has a straight section. Similarly, each of the upper coil layers 91 has a straight section. Each of the straight sections is laid to overlap with one of the straight sections within one of the slots 20. An end of each of the lower coil layers 90 extending outside one of the slots 20 is joined to an end of one of the upper coil layers 91 extending outside another of the slots 20. Such joining is achieved after the upper and lower coil layers 91 and 90 are inserted into the slots 20 and arranged inside the armature core 8.

Each of the upper coil layers 91 has a coil end 91*a* continuing from the straight section disposed in the slot 20. The coil end 91*a* extends outside the slot 20 in parallel to the end wall of the armature core 8 inwardly and serves as one of the commutator segments 10. The commutator segments 10 are arrayed circumferentially of the end wall of the armature core 8. The array of the commutator segments 10 has a major surface (i.e., the commutator surface facing right, as viewed in FIG. 7) on which the brushes 6 ride. Each of the brushes 6 is, like the first embodiment, retained by a brush holder (not shown) and urged by a brush spring (not shown) into constant abutment with the commutator surface. A combination of each brush holder and each brush spring may be of a known structure, and explanation thereof in detail will be omitted here.

Ridges are defined, as illustrated in FIG. 7, by the grooves 12 formed in the commutator surface in the form of closed loops. The ridges lie at least within an area where the brushes 6 slide on the commutator surface. The grooves 12 extend coaxially with the axis of the armature shaft 7 at equi-intervals away from each other.

Figure 8:
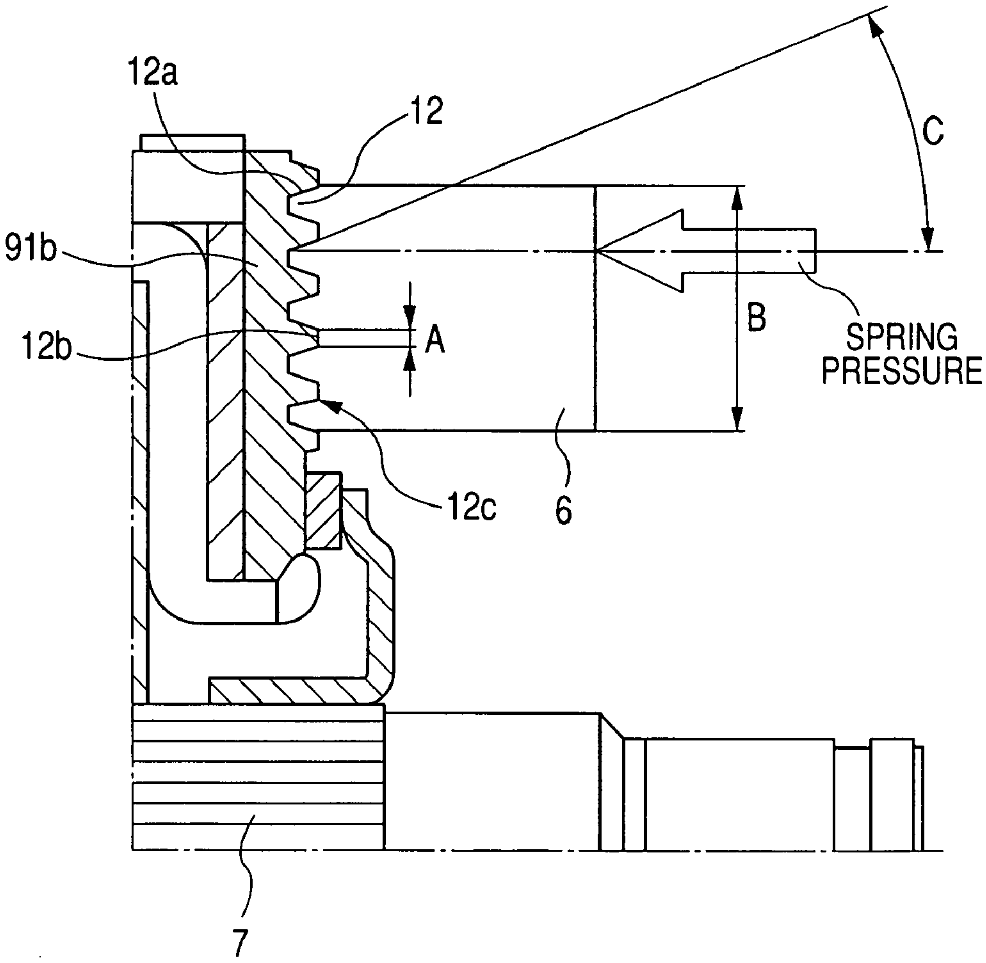
FIG. 8 is a partially enlarged view which shows a brush and a commutator installed in the dc motor of FIG. 7.

Each of the side walls 12*a* of the grooves 12 (i.e., the ridges), as illustrated in FIG. 8, slants with respect to the axial direction of the armature core 8. Specifically, each of the side walls 12*a* extends at an angle C to the direction in which the pressure, as produced by each of the springs, acts on one of the brushes 6. The angle C is, like the first embodiment, determined preferably to fall within a range of 20° to 70° and more preferably within a range of 30° to 55°.

The ridges (i.e., the grooves 12) of the commutator surface serve to ensure the stability of engagement of the brushes 6 with the surface of the commutator 5, thereby enhancing the effects of the voltage commutation which improves the speed of rotation of the armature 4 within the low-current range without use of the auxiliary poles installed in conventional structures.

In the high-current range, the current density in the brushes 6 increases, thereby reducing the above described effects of the voltage commutation so that the output performance of the starter motor 1 will be identical with those in typical starter motors.

The inclination of the side walls 12*a* of the grooves 12 to the direction or orientation of the spring pressure acting on the brushes 6 enhances the efficiency in exerting the spring pressure on the side walls 12*a*, thus resulting in the stability of sliding motion of the brushes 6 in contact with the commutator 5 to enhance the improvement of the speed of rotation of the armature 4 in the low-current range.

The starter motor 1 of the third embodiment may be designed to have the structure of the second embodiment. Specifically, the width B of each of the brushes 6 and the total width L that is the sum of widths A of the tops surface 12*b* of the ridges, as defined by the grooves 12 of the commutator 5, within the width B may be selected to meet a relation of $L/B \leqq 1/2$.

Figure 9:
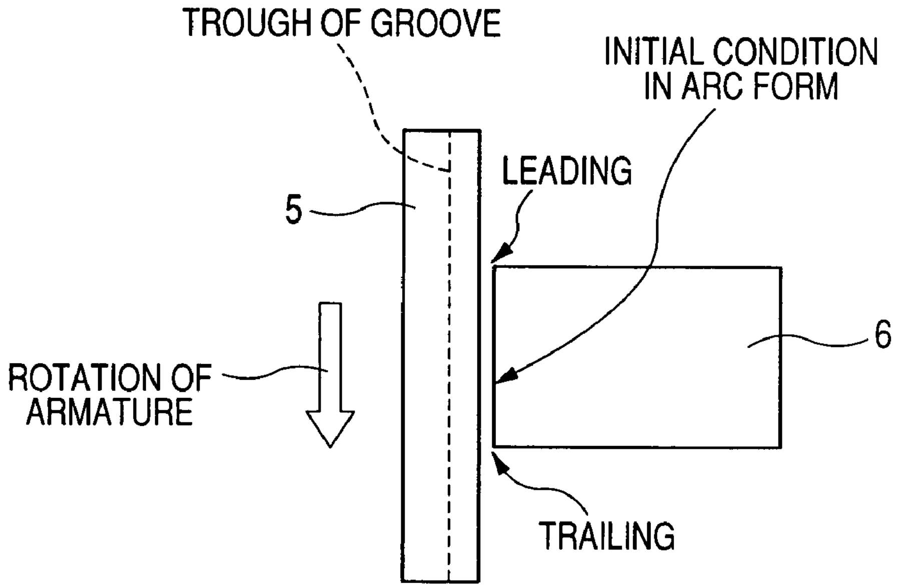
FIG. 9 is a partially side view which shows the shape of a brush before worn by sliding thereof on a commutator in the third embodiment.

The sliding surface of each of the brushes 6 is, as illustrated in FIG. 9, machined to be an even or flat surface before installed in the starter motor 1, that is, before worn by the sliding thereof on the surface of the commutator 5. Specifically, the sliding surface of each of the brushes 6 is shaped to be flat so that it conforms to the contour of the surface of the commutator 5, as viewed in a radius direction thereof.

Referring back to FIG. 9, corners 12*c* of the ridges, as each defined by a boundary between one of the top surfaces 12*b* of the ridges and an adjacent one of the side walls 12*a*, is rounded sharply at a radius of curvature of 0.1 mm or less, thereby facilitating the conforming of the sliding surface of each of the brushes 6 in the mint condition to the grooves 12 of the commutator 5, which ensures the stability of sliding contact therebetween within a decreased time.

The dc motor of the invention is used as the starter motor 1 in each of the above embodiments, but may be employed in any other types of motors having permanent magnets as field magnets. The starter motor 1 of the third embodiment may be designed to have the commutator segments 10 made of materials separate from the coil ends 91*a* of the upper coil layers 91.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. A dc motor comprising:

a yoke forming a magnetic circuit;

an array of permanent magnets disposed along an inner circumference of said yoke;

an armature disposed inside said array of permanent magnets to be rotatable;

a commutator provided to be rotatable together with said armature, said commutator having an outer circumferential surface;

a brush riding on a commutator surface that is the outer circumferential surface of said commutator, said brush being urged elastically in a given direction into constant engagement with the commutator surface; and a plurality of protrusions that are arrayed on the commutator surface in a first direction perpendicular to a second direction that is a direction in which said commutator is to be rotated and extend over a whole of a circumference of the commutator surface, each of the protrusions being defined by two side walls arrayed adjacent to each other in the first direction, at least one of the two side walls of each of the protrusions being oriented to be inclined at a preselected angle to the given direction in which said brush is urged elastically, the preselected angle lying in a range of 30° to 55°.

2. A dc motor as set forth in claim 1, wherein the two side walls of each of the protrusions are oriented to be inclined at the preselected angle to the given direction.

3. A dc motor as set forth in claim 1, wherein the range of the preselected angle at which the least one of the two side walls of each of the protrusions is inclined is 45°.

4. A dc motor as set forth in claim 1, wherein the two side walls of each of the protrusions are oriented to be inclined at the preselected angle to the given direction.

5. A dc motor as set forth in claim 1, wherein said brush has a sliding surface placed in sidable contact with the commutator surface, the sliding surface having a width B extending in the first direction, each of said protrusions having a top surface defined between the side walls, a total width L that is sum of widths of the top surfaces of the protrusions lying within the width B being selected to meet a relation of $L/B \leqq 1/2$, and wherein when said brush is initially placed in the constant engagement with the commutator surface, the sliding surface of said brush is substantially shaped to conform to a contour of the commutator surface in a circumferential direction thereof.

6. A dc motor as set forth in claim 5, wherein each of said protrusions has corners each of which is defined between the top surface and one of the side walls, each of the corners being shaped sharply.

7. A dc motor as set forth in claim 6, wherein each of the corners is rounded at a radius of curvature of 0.10 mm or less.

8. A dc motor as set forth in claim 1, wherein said armature has an armature shaft producing torque, and wherein said commutator includes a plurality of commutator segments arrayed in a cylindrical form around an outer periphery of the armature shaft to define the commutator surface.

9. A dc motor as set forth in claim 1, wherein said armature has an armature shaft producing torque, and wherein said commutator includes a plurality of commutator segments arrayed to define the commutator surface extending in a direction perpendicular to the armature shaft.

10. A dc motor as set forth in claim 1, wherein the dc motor is used as a starter motor designed to start an internal combustion engine.

* * * * *